3,280,226
BIS-(CARBAMYL) ALKYL AMIDES OF PHORPHORUS ACID ESTERS

Eugene F. Barnas and Sidney B. Richter, Chicago, Ill., assignors to Velsicol Chemical Corporation, Chicago, Ill., a corporation of Illinois
No Drawing. Filed Feb. 5, 1964, Ser. No. 342,781
10 Claims. (Cl. 260—942)

This invention relates to new chemical compositions of matter. More specifically, this invention relates to new chemical compounds of the formula

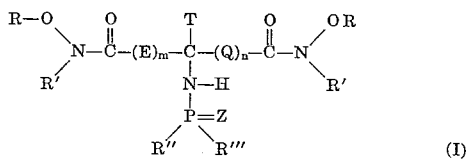

wherein R and R' are independently selected from the group consisting of hydrogen and alkyl and acyl groups containing from one to ten carbon atoms, provided that at least one of R and R' is selected from the group consisting of hydrogen and alkyl groups containing from one to ten carbon atoms; m and n are integers from 0 to 1; E and Q are independently selected from the group consisting of alkylene groups containing from one to ten carbon atoms; T is selected from the group consisting of hydrogen and alkyl groups containing from one to four carbon atoms; Z is selected from the group consisting of oxygen and sulfur; and R" and R''' are independently selected from the group consisting of alkyl, alkoxy, alkylthio, aryl, aryloxy, arylthio, aralkyl, aralkoxy, and aralkylthio groups containing from one to ten carbon atoms. In a preferred embodiment of the present invention, m, n, E, Q, T, Z, R" and R''' are as described above and R and R' are alkyl groups containing from one to ten carbon atoms. These new chemical compounds are useful as pesticides, particularly as insecticides and miticides.

These new compounds can be prepared readily from the corresponding amino substituted alkyl diamide intermediate. This intermediate is reacted at its amino substitution with a halide of the appropriate phosphorus acid, said halide having the formula Hal—P(Z)(R")(R'''), wherein Z, R" and R''' are as described above and Hal is a halogen atom, to form the desired compound of the present invention. The amino substituted alkyl can be prepared readily from the corresponding haloalkyl diamide by reacting at its halogen substitution with ammonia. The substituted haloalkyl diamide intermediate described above can be prepared from its corresponding diacid halide by treatment with an amine of the formula HN(OR)(R') wherein R and R' are as described above.

Many of the diacid halides are known to the art and are commercially available. Alternatively, the suitable halides can be readily prepared from suitable starting material haloalkyl diacids or their anhydrides, by converting to the diacid halide. These suitable starting material diacids have the formula

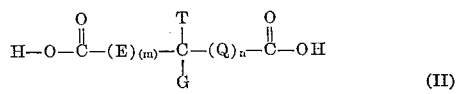

wherein E, Q, T, m and n are as described above; and G is chlorine, or bromine. Anhydrides of these diacids can also be utilized where available. Thus Formula II defines the starting material haloalkyl diacids which can be utilized to prepare the compounds of the present invention. Exemplary of the chloro- or bromoalkyl starting material diacids are: bromomalonic acid, chloromalonic acid, bromosuccinic acid, chlorosuccinic acid, α-chloroglutaric acid, β-bromoglutaric acid, α-bromoadipic acid, α-bromopimelic acid, α-chloroadipic acid, α-chloro-γ-methylglutaric acid, α-bromo-β-ethyl-β-methylsuccinic acid, α-chlorosuberic acid, α-bromosuberic acid, δ-chloroazelaic acid, and the like.

The amines which are useful as reactants to form the amides of the present invention are those having the formula

wherein R and R' are as heretofore described. Suitable amines having Formula III are commercially available or can be prepared, for example, by the reduction of the corresponding oximes as described by Jones and Major, J. Am. Chem. Soc., vol. 52, pp. 669–79 (1930). Alternatively these amines can be prepared by reacting hydroxy urethane with a halide of the desired suitable substituent group, for example an alkyl or acyl halide, in the presence of sodium methoxide and converting to the amine with a base such as alcoholic potassium hydroxide. If R and R' are to be identical, twice the molecularly equivalent quantity of halide can be used to form the appropriately substituted urethane which is then converted to the amine. However, if R and R' are to be nonidentical, then one molecularly equivalent quantity of a suitable agent, such as the appropriate alkyl-or acyl halide is reacted with hydroxyurethane to form the —O—R group, and the resulting product reacted with a molecularly equivalent quantity of a second halide agent, such as one of those described above, to form the —R' group. The urethane is then converted to the free amine by a method common to the art, such as the method described above. It will be noted that conversion to the amine can be performed after reaction of hydroxyurethane with the first halide agent, if desired, and reaction of the resulting monosubstituted amine with the second halide agent performed thereafter.

Where one of R and R' is to be acyl, the acyl group can be substituted onto the amine reactant before reaction with the appropriate diacid chloride intermediate. In this method, the corresponding hydroxy-, hydroxyalkyl- or alkoxyamine is prepared as described above and is reacted with a molecularly equivalent quantity of a suitable acyl halide. The reaction is conveniently performed in the presence of a molecularly equivalent amount of an acid scavenger, such as pyridine, in a solvent such as benzene. Suitable acyl halides for use in preparing the desired intermediates are: acetyl chloride, acetyl bromide, propionyl chloride, propionyl bromide, n-butyryl chloride, n-butyryl bromide, isobutyryl chloride, n-valeryl chloride, isovaleryl chloride, n-caproyl chloride, n-caprylyl chloride, and the like.

Exemplary of the suitable amines of Formula III which are useful in forming the compounds of the present invention and which can be prepared by one or more of the above procedures are: hydroxyamine, N-methoxyamine, N-hydroxy-N-methylamine, N-ethoxyamine, N-hydroxy-N-propylamine, N-methoxy-N-methylamine, N-ethoxy-N-methylamine, N-ethoxy-N-ethylamine, N-methoxy-N-ethylamine, N-propoxy-N-methylamine, N-propoxy-N-ethylamine, N-propoxy-N-propylamine, N-methoxy-N-propylamine, N-butoxy-N-butylamine, N-butoxy-N-methylamine, N-methoxy-N-butylamine, N-pentyloxy-N-ethylamine, N-nonyloxy-N-methylamine, N-nonyloxyamine, N-decyloxy-N-propylamine, N-hydroxy-N-decylamine, N-methoxy-N-decylamine, N-acetoxy-N-methylamine, N-methoxy-N-acetylamine, N-methoxy-N-propionylamine, and the like.

The halides of the phosphorus acids which can be used as reactants in the preparation of the compounds of the present invention have the formula

wherein Hal, Z, R″ and R‴ are as heretofore described. These halides fall into various groups depending on the identity of Z, R″ and R‴. Thus when Z is oxygen and R″ and R‴ are alkyl or aryl, in Formula IV, the halides of the phosphorus acids are called secondary phosphonyl halides; whereas, when R″ and R‴ are alkoxy or aryloxy the compounds are called secondary halophosphates; and when R″ and R‴ are alkylthio or arylthio, halodithiophosphates. Furthermore when Z is sulfur, the halides of Formula IV wherein R″ and R‴ are alkyl or aryl, are termed secondary thionophosphonyl halides; whereas when R″ and R‴ are alkoxy or aryloxy, they are termed secondary halothionophosphates; and when R″ and R‴ are alkylthio or arylthio, halodithiothionophosphates. Examples of these suitable reactants in the preparation of the compounds of the present invention are: dimethylphosphonyl chloride, P-methyl-P-ethylphosphonyl chloride, diethylphosphonyl chloride, dipropylphosphonyl chloride, dibutylphosphonyl chloride, P-methyl-P-phenylphosphonyl chloride, P-ethyl-P-phenylphosphonyl chloride, diphenylphosphonyl chloride, P-(p-tolyl)-P-phenylphosphonyl chloride, P-(2,4,5-trimethylphenyl)-P-phenylphosphonyl chloride, di-o-tolylphosphonyl chloride, di-p-tolylphosphonyl chloride, P-methyl-P-ethylthionophosphonyl chloride, P-ethyl-P-phenylthionophosphonyl chloride, di-o-tolylthionophosphonyl chloride, di-p-tolylthionophosphonyl chloride. P-p-tolyl-P-phenylthionophosphonyl chloride, dimethyl fluorophosphate, diethyl fluorophosphate, dipropyl fluorophosphate, dimethyl chlorophosphate, diethyl chlorophosphate, diisopropyl chlorophosphate, dibutyl chlorophosphate, diisobutyl chlorophosphate, diisoamyl chlorophosphate, di-(α-ethylpropyl) chlorophosphate, di-(α-methylisobutyl) chlorophosphate, dibenzyl chlorophosphate, diphenyl fluorophosphate, diphenyl chlorophosphate, di(p-tertbutyl-phenyl) chlorophosphate, O-ethyl O-phenyl chlorophosphate, O-o-tolyl O-phenyl chlorophosphate, O-p-tolyl O-phenyl chlorophosphate, dimethyl chlorothionophosphate, diethyl chlorothionophosphate, dibutyl chlorothionophosphate, diphenyl chlorothionophosphate, diphenyl bromothionophosphate, di-o-tolyl chlorothionophosphate, di-m-tolyl chlorothionophosphate, di-p-tolyl chlorothionophosphate, S,S-diethyl chlorodithiophosphate, S,S-diethyl fluorodithiophosphate, S,S-diethyl chlorodithiothionophosphate, and the like.

More particularly, the aminoalkyl diamide intermediate prepared according to the above procedure, for example, from a haloalkyl diacid starting material, is reacted with the appropriate halide of the phosphorus acid heretofore described to form the desired compound of the present invention. The reaction is readily performed by contacting molecularly equivalent amounts of the intermediate, the phosphorus acid halide and an organic base, such as pyridine in a suitable solvent such as benzene. The mixture is heated for several hours, preferably at reflux if benzene is utilized as the solvent. After the reaction is completed, the mixture is filtered, the filtrate washed with water, dried and the solvent removed in vacuo, with heating if necessary, to recover the crude product of the present invention which may be used in pesticidal applications as such, or can be purified as heretofore described.

The aminoalkyl diamide intermediate heretofore described can be readily prepared from the haloalkyl diamide intermediate. This step can be performed by saturating an organic solvent, such as benzene, with ammonia, and adding the haloalkyl diamide intermediate thereto. The mixture is stirred for several hours, such as from 2 to 20 hours and then gently heated, filtered to remove precipitated ammonium chloride salt, washed with water, dried, and heated in vacuo to distill off the solvent and excess ammonia to yield aminoalkyl diamide intermediate as the residue, which can be recrystallized from a suitable solvent.

The haloalkyl diamide intermediate can be readily prepared by reacting the diacid halide with a molecularly equivalent quantity of the appropriate amine of the Formula III, or preferably its hydrochloride for each acid halide group present, in the presence of a base, such as an alkali metal base, of which sodium hydroxide, potassium hydroxide and potassium carbonate are exemplary. At least one molecularly equivalent quantity of base is used when the free amine is utilized as the reactant, and at least twice that amount is used when the amine-hydrochloride is used as the reactant. The base is used to release the amine from its hydrochloride and to neutralize the hydrogen chloride formed during the reaction. A small amount of water is preferably added to the reaction mixture to form an aqueous solution of the base to aid in mixing the base into the solution of the amine or amine hydrochloride reactant.

This reaction is conveniently performed by contacting the reactants for several hours at a temperature from about −20° C. to about room temperature. It has also been found convenient to utilize a solvent or diluent to aid in temperature control.

The resulting diamide intermediate formed by the above procedure can be separated from the reaction mixture by means common to the art, such as by separating the organic phase, washing with potassium carbonate solution to remove excess acid chloride, washing with water to remove salts, and drying and distilling the organic phase in vacuo to remove solvent to recover the amide as the residue. The diamide intermediate thus obtained can be used in the preparation described herein as such, or can be purified by means common to the art, such as distillation in vacuo, or recrystallization from a suitable solvent.

The acid halides utilized in the preparation of the new compounds of the present invention can be readily prepared from one of the suitable starting material diacids heretofore described. In this reaction the starting material diacid is treated with two molecularly equivalent quantities of a suitable agent, such as thionyl chloride or a phosphorus trihalide, to form the acid halide. The conversion to the acid halide can be performed in a solvent, or diluent, such as benzene. The treatment is performed by heating for several hours, preferably at reflux if a solvent or diluent is used. The corresponding acyl halide thus formed can be isolated from the reaction mixture by means common to the art, such as by distillation in vacuo of the solvent or diluent and unreacted reactants, leaving the acid halide as the residue.

The manner in which the new compounds of this invention can be prepared is illustrated in the following examples.

EXAMPLE 1

*Preparation of N,N′-dimethoxy-N,N′-dimethyl-α-chlorosuccinamide*

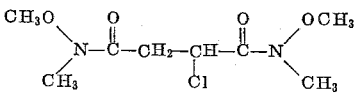

Sodium hydroxide (6.4 g.) is dissolved into water (40 ml.) in a 250 ml., three-necked, round-bottom flask, fitted with a mechanical stirrer and cooling bath. 1,2-dichloroethane (100 ml.) is added and the mixture stirred and cooled for several minutes. N-methoxy-N-methylamine-hydrochloride (7.8 g.) is added and stirring and cooling is continued for about five minutes. To the above mixture is added α-chlorosuccinyl chloride (7.6 g.; 0.04 mol.) over a period of ten minutes during which time the temperature of the reaction mixture is maintained at between −10° C. and −15° C. After the addition is complete the mixture is stirred for about 1 hour and the organic layer is separated from the mixture, washed with 5% aqueous sodium carbonate solution and then with water, dried over magnesium sulfate, filtered, and the filtrate stripped of dichloroethane in vacuo, leaving the crude product as the residue. The residue is recrystallized from a suitable solvent to yield N,N'-dimethoxy-N,N'-dimethyl-α-chlorosuccinamide.

EXAMPLE 2

*Preparation of N,N'-dimethoxy-N,N'-dimethyl-α-aminosuccinamide*

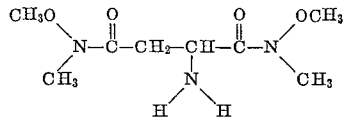

Benzene (200 ml.) is cooled and saturated with ammonia gas in a 500 ml., three-necked, round-bottom flask fitted with a gas inlet tube, a Dry Ice acetone condenser, a mechanical stirrer and a cooling bath. N,N'-dimethoxy-N,N'-dimethyl-α-chlorosuccinamide (7.2 g.; 0.03 mol.) prepared as described in Example 1, is added to the ammonia saturated solution and the mixture is stirred while warming to room temperature. Thereafter the mixture is stirred at room temperature for about 16 hours and then gently heated. The mixture is filtered and the filtrate washed with water, dried over anhydrous magnesium sulfate, filtered from the drying agent and heated in vacuo to remove the solvent and excess ammonia to leave the crude product as the residue. This residue is recrystallized from a suitable solvent to yield N,N'-dimethoxy-N,N'-dimethyl-α-aminosuccinamide.

EXAMPLE 3

*Preparation of N,N'-dimethoxy-N,N'-dimethyl-α-(O,O-dimethylpohsphorothionoamido)succinamide*

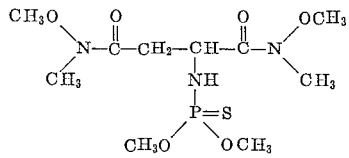

N,N' - dimethoxy - N,N'-dimethyl-α-aminosuccinamide (4.2 g.; 0.019 mol.) prepared as described in Example 2, is placed into a 250 ml., three-necked, round-bottom flask equipped with a reflux condenser and a mechanical stirrer. Benzene (150 ml.) and pyridine (1.6 g.) are added, the mixture stirred, and dimethyl chlorothionophosphate (3.1 g.) added over a period of five minutes. The resulting mixture is stirred and heated at reflux for about 16 hours. After cooling, the reaction mixture is filtered, and the filtrate washed with water, dried over anhydrous magnesium sulfate, filtered from the drying agent, and heated in vacuo to remove the benzene and recover the crude product as the residue. This residue is purified by chromatography to yield N,N'-dimethoxy-N,N'-dimethyl-α-(O,O-dimethylphosphorothionoamido)succinamide.

EXAMPLE 4

*Preparation of N,N'-diethoxy-N,N'-diethyl-α-chlorosuccinamide*

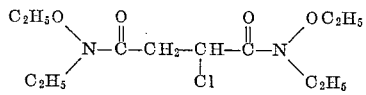

Sodium hydroxide (6.4 g.) is dissolved into water (40 ml.) in a 250 ml., three-necked, round-bottom flask, fitted with a mechanical stirrer and cooling bath. 1,2-dichloroethane (100 ml.) is added and the mixture stirred and cooled for several minutes. N-ethoxy-N-ethylamine-hydrochloride (10.1 g.) is added and stirring and cooling is continued for about five minutes. To the above mixture is added α-chlorosuccinyl chloride (7.6 g.; 0.04 mol.) over a period of ten minutes during which time the temperature of the reaction mixture is maintained at between about −10° C. and −15° C. After the addition is complete the mixture is stirred for about 1 hour and the organic layer is separated from the mixture, washed with 5% aqueous sodium carbonate solution and then with water, dried over magnesium sulfate, filtered, and the filtrate stripped of dichloroethane in vacuo, leaving the crude product as the residue. The residue is recrystallized from a suitable solvent to yield N,N'-diethoxy-N,N'-diethyl-α-chlorosuccinamide.

EXAMPLE 5

*Preparation of N,N'-diethoxy-N,N'-diethyl-α-aminosuccinamide*

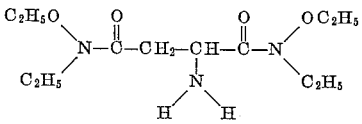

Benzene (200 ml.) is cooled and saturated with ammonia gas in a 500 ml., three-necked, round-bottom flask fitted with a gas inlet tube, Dry Ice-acetone condenser, a mechanical stirrer and a cooling bath. N,N'-diethoxy-N,N'-diethyl-α-chlorosuccinamide (8.8 g.; 0.03 mol.) prepared as described in Example 4, is aded to the ammonia saturated solution and the mixture is stirred while warming to room temperature. Thereafter the mixture is stirred at room temperature for about 16 hours and then gently heated. The mixture is filtered and the filtrate washed with water, dried over anhydrous magnesium sulfate, filtered from the drying agent and heated in vacuo to remove the solvent and excess ammonia to leave the crude product as the residue. This residue is recrystallized from a suitable solvent to yield N,N'-diethoxy-N,N'-diethyl-α-aminosuccinamide.

EXAMPLE 6

*Preparation of N,N'-diethoxy-N,N'-diethyl-α-(O,O-dimethylphosphorothionoamido)succinamide*

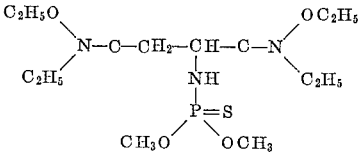

N,N'-diethoxy-N,N'-diethyl-α-aminosuccinamide (5.2 g.; 0.019 mol) prepared as described in Example 5, is placed into a 250 ml., three-necked, round-bottom flask equipped with a reflux condenser and a mechanical stirrer. Benzene (150 ml.) and pyridine (1.6 g.) are added, the mixture stirred, and dimethyl chlorothionophosphate (3.1 g.) added over a period of five minutes. The resulting mixture is stirred and heated at reflux for about 16 hours. After cooling, the reaction mixture is filtered, and the filtrate washed with water, dried over anhydrous magnesium sulfate, filtered from the drying agent, and heated in vacuo to remove the benzene and recover the crude product as the residue. This residue is purified by chromatography to yield N,N'-diethoxy-N,N'-diethyl-α-(O,O-dimethylphosphorothionoamido)succinamide.

EXAMPLE 7

*Preparation of N,N'-diacetoxy-N,N¹-dimethyl-α-chlorosuccinamide*

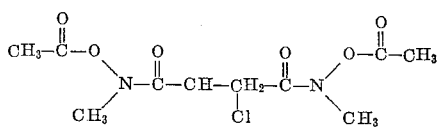

N-acetoxy-N-methylamine hydrochloride (37.6 g.; 0.3 mol) and α-chlorosuccinyl chloride (30 g.; 0.16 mol) are reacted in the presence of sodium hydroxide (23.8 g.; 0.6 mol) according to the procedure of Example 4, to obtain N,N'-diacetoxy-N,N'-dimethyl-α-chlorosuccinamide.

EXAMPLE 8

*Preparation of N,N'-diacetoxy-N,N'-dimethyl-α-aminosuccinamide*

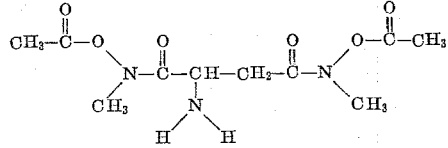

N,N'-diacetoxy-N,N'-dimethyl - α - chlorosuccinamide (8.8 g.; 0.03 mol) prepared as described in the previous example is treated with benzene (200 ml.) saturated with ammonia gas by the procedure of Example 5 to yield N,N-diacetoxy-N,N'-dimethyl-α-aminosuccinamide.

EXAMPLE 9

*Preparation of N,N'-diacetoxy-N,N'-dimethyl-α-(O,S-dimethylthiophosphoroamido)succinamide*

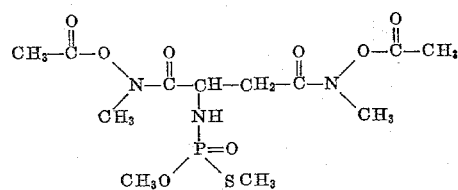

N,N' - diacetoxy - N,N' - dimethyl - α - aminosuccinamide (8.25 g.; 0.03 mol) prepared as described in the previous example is reacted with O,S-dimethylchlorothiophosphate (5.1 g.; 0.03 mol) by the procedure of Example 6 to yield N,N'-diacetoxy-N,N'-dimethyl-α-(O,S-dimethylthiophosphoroamido)succinamide.

It will be readily recognized that in view of the preparation procedure detailed in the above examples, one skilled in the art could now prepare other compounds within the scope of the present invention from the appropriate starting materials heretofore described. Thus, by way of illustration, presented in the examples below are the appropriate starting materials and reactants required to prepare the named compounds of the present invention. Although, α-chlorosuccinyl chloride, N-methoxy-N-methylamine, and N-methoxy-N-isopropylamine, represented for brevity as CSC, MMA, and MIPA respectively, are used in the examples for the purpose of illustration, other starting materials and reactants as heretofore described can be substituted therefor.

EXAMPLE 10

CSC+MMA+O,O-dimethyl chlorophosphate=N,N'-dimethoxy - N,N' - dimethyl - α - (O,O - dimethylphosphoroamido)succinamide.

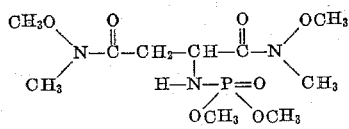

EXAMPLE 11

CSC+MMA+P - methoxy - P - phenylthionophosphonyl chloride=N,N' - dimethoxy - N,N' - dimethyl - α - (P-methoxy-P-phenylthionoamidophosphonyl)succinamide.

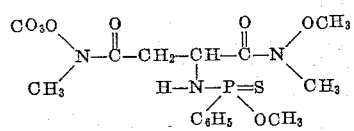

EXAMPLE 12

CSC+MMA+O,S-dimethyl chlorothiophosphate=N,N' - dimethoxy - N,N' - dimethyl - α - (O,S - dimethylthiophosphoroamido)succinamide.

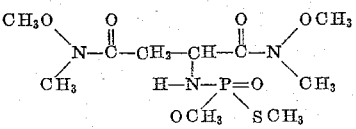

EXAMPLE 13

CSC+MMA+P - methoxy - P - methylthionophosphonyl chloride=N,N' - dimethoxy - N,N'-dimethyl - α - (P-methoxy-P-methylthionoamidophosphonyl)succinamide.

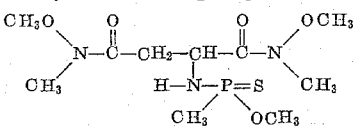

EXAMPLE 14

CSC+MIPA+O,O - dimethyl chlorothionophosphate =N,N'-dimethoxy - N,N' - isopropyl - α - (O,O-dimethylphosphorothionoamido)succinamide.

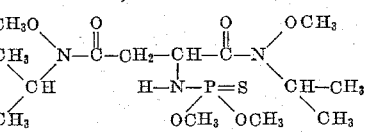

EXAMPLE 15

CSC+N - methoxy - N-n-propylamine+O,O-dimethyl chlorothionophosphate=N,N' - dimethoxy - N,N' - di-n-propyl - α - (O,O-dimethylphosphorothionoamido)succinamide.

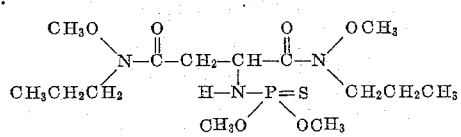

EXAMPLE 16

CSC+MIPA+P - methoxy-P-phenylthionophosphonyl chloride=N,N'-dimethoxy-N,N'-diisopropyl - α - (P-methoxy-P-phenylthionoamidophosphonyl)succinamide.

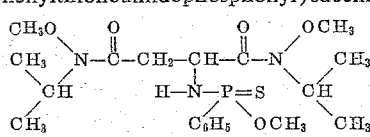

EXAMPLE 17

CSC+N - isopropoxy-N-isopropylamine+O,O-dimethyl chlorothionophosphate=N,N' - diisopropoxy - N,N'-diisopropyl - α - (O,O-dimethylphosphorothionoamido)succinamide.

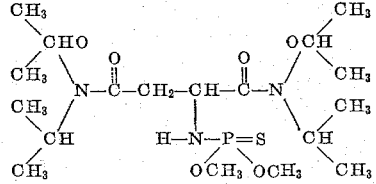

Among the other compounds of the present invention which can similarly be prepared are:

EXAMPLE 18

N,N'-diisopropoxy-N,N'-dimethyl - α - (O,O-dimethylphosphorothionoamido)succinamide.

EXAMPLE 19

N,N'-dimethoxy-N,N'-dimethyl - α - (P,P-dimethylthionoamidophosphonyl)succinamide.

EXAMPLE 20

N,N'-dimethoxy - α - N,N'-trimethyl-α-(O,O-dimethyl-phosphorothionoamido)succinamide.

EXAMPLE 21

N,N'-dimethoxy-N,N'-dimethyl - α - (O,O - dimethyl-phosphorothionoamido)glutaramide.

EXAMPLE 22

N,N'-dimethoxy-N,N'-dimethyl - α - (P-methyl-P-phenylthionoamidophosphonyl)succinamide.

EXAMPLE 23

N,N'-dimethoxy - α - (O,O-dimethylphosphorothionoamido)succinamide.

For practical use as insecticides, the compounds of this invention are generally incorporated into insecticidal compositions which comprise an inert carrier and an insecticidally toxic amount of such a compound. Such insecticidal compositions, which are usually known in the art as formulations, enable the active compound to be applied conveniently to the site of the insect infestation in any desired quantity. These compositions can be solids such as dusts, granules, or wettable powders; or they can be liquids such as solutions or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, onto and into granulated carriers such as the attapulgites or the vermiculites, usually of a particle size range of from about 0.3 to 1.5 mm. Wettable powders, which can be dispersed in water to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. Frequently, solutions of insecticides can be dispersed under superatmospheric pressure as aerosols. However, preferred liquid insecticidal compositions are emulsifiable concentrates, which comprise an active compound according to this invention and as the inert carrier, a solvent and an emulsifier. Such emulsifiable concentrates can be diluted with water to any desired concentration of active compound for application as sprays to the site of the insect infestation. The emulsifiers most commonly used in these concentrates are nonionic or mixtures of nonionic with anionic surface-active agents.

A typical insecticidal composition according to this invention is illustrated by the following example, in which the quantities are in parts by weight.

EXAMPLE 24

*Preparation of a dust*

Product of Example 3 _____ 10
Powdered talc _____ 90

The above ingredients are mixed in a mechanical grinder-blender and are ground until a homogeneous, free-flowing dust of the desired particle size is obtained. This dust is suitable for direct application to the site of the insect infestation.

The insecticides of this invention can be applied in any manner recognized by the art. The concentration of the new compounds of this invention in the insecticidal compositions will vary greatly with the type of formulation and the purpose for which it is designed, but generally the insecticidal compositions will comprise from about 0.025 to about 95 percent by weight of the active compounds of this invention. In a preferred embodiment of this invention, the insecticidal compositions will comprise from about 5 to about 75 percent by weight of the active compound. The compositions can also comprise such additional substances as other pesticides, spreaders, adhesives, stickers, fertilizers, activators, synergists, and the like.

The new compound of this invention can be used in many ways for the control of insects. Insecticides which are to be used as stomach poisons or protective materials can be applied to the surface on which the insects feed or travel. Insecticiles which are to be used as contact poisons or eradicants can be applied directly to the body of the insect, as a residual treatment to the surface on which the insect may walk or crawl, or as a fumigant treatment of the air which the insect breathes. In some cases, the compounds applied to the soil or plant surfaces are taken up by the plant, and the insects are poisoned systemically.

The above methods of using insecticides are based on the fact that almost all the injury done by insects is a direct or indirect result of their attempts to secure food. Indeed, the large number of destructive insects can be classified broadly on the basis of their feeding habits. There are, for example, the chewing insects such as the Mexican bean beetle, the southern armyworm, cabbageworms, grasshoppers, the Colorado potato beetle, the cankerworm, and the gypsy worm. There are also the piercing-sucking insects, such as the pea aphid, the house fly, the chinch bug, leafhoppers, and plant bugs.

Another group of insects comprises the internal feeders. These include borers such as the European corn borer and the corn earworm; worms or weevils such as the codling moth, cotton boll weevil, plum curculio, melonworm, and the apple maggot; leaf miners such as the apple leaf miner and the beet leaf miner; and gall insects such as the wheat jointworm and grape phylloxera. Insects which attack below the surface of the ground are classified as subterranean insects and include such destructive pests as the wooly apple aphid, the Japanese beetle, and the corn rootworm.

Mites and ticks are not true insects. Many economically important species of mites and ticks are known, including the red spider mite, the strawberry spider mite, the cattle tick, and the poultry mite. Chemicals useful for the control of mites are often called miticides, while those useful for the control of both mites and ticks are known specifically as acaricides.

The quantity of active compound of this invention to be used for insect control will depend on a variety of factors, such as the specific insect involved, intensity of the infestation, weather, type of environment, type of formulation, and the like. For example, the application of only one or two ounces of active chemical per acre may be adequate for control of a light infestation of an insect under conditions unfavorable for its feeding, while a pound or more of active compound per acre may be required for the control of a heavy infestation of insects under conditions favorable to their development.

The insecticidal and miticidal activity of the compounds of this invention can be demonstrated by various experiments recognized by the art for the control of the insects and mites heretofore described. For example, in one series of experiments utilized to demonstrate the insecticidal and miticidal activity of these compounds, the test compounds are formulated by dissolving the compounds in acetone and dispensing the acetone solutions in distilled water containing a small amount of emulsifier, such as 0.2% by volume of alkyl aryl polyether alcohol type emulsifier. The above formulation is then applied to the environment of the insects and mites, that is, depending upon their feeding and traveling habits, the formulation is either sprayed on the insects or mites, their food is sprayed, or the soil in which their food is growing is sprayed. The treated insects and mites are then observed for a period of from several hours to several days and their mortality compared with untreated controls. Several replicates are used in each experiment. The results of these experiments indicate that the compounds of the present invention possess a high order of insecticidal and miticidal activity.

We claim:

1. A compound of the formula

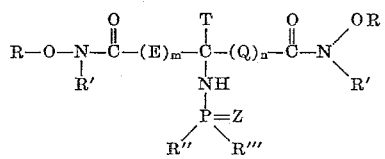

wherein R and R' are independently selected from the group consisting of hydrogen and alkyl and unsubstituted alkyl acyl groups containing from one to ten carbon atoms, provided that at least one of R and R' is selected from the group consisting of hydrogen and alkyl groups containing from one to ten carbon atoms; $m$ and $n$ are integers from 0 to 1; E and Q are independently selected from the group consisting of alkylene groups containing from one to ten carbon atoms; T is selected from the group consisting of hydrogen and alkyl groups containing from one to four carbon atoms; Z is selected from the group consisting of oxygen and sulfur; and R" and R''' are independently selected from the group consisting of alkyl, alkoxy, alkylthio, aryl, aryloxy, arylthio, aralkyl, aralkoxy and aralkylthio groups containing from one to ten carbon atoms.

2. A compound of the formula

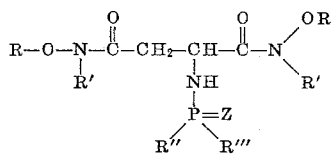

wherein R and R' are independently selected from the group consisting of hydrogen and alkyl and unsubstituted alkyl acyl groups containing from one to ten carbon atoms, provided that at least one of R and R' is selected from the group consisting of hydrogen and alkyl groups containing from one to ten carbon atoms; Z is selected from the group consisting of oxygen and sulfur; and R" and R''' are independently selected from the group consisting of alkyl, alkoxy, alkylthio, aryl, aryloxy, arylthio, aralkyl, aralkoxy and aralkylthio groups containing from one to ten carbon atoms.

3. A compound of the formula

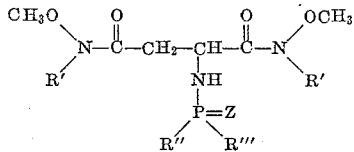

wherein R' is selected from the group consisting of hydrogen and alkyl and unsubstituted alkyl acyl groups containing from one to ten carbon atoms; Z is selected from the group consisting of oxygen and sulfur; and R" and R''' are independently selected from the group consisting of alkyl, alkoxy, alkylthio, aryl, aryloxy, arylthio, aralkyl, aralkoxy, and aralkylthio groups containing from one to ten carbon atoms.

4. A compound of the formula

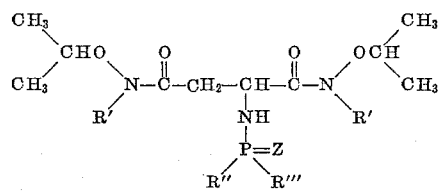

wherein R' is selected from the group consisting of hydrogen and alkyl and unsubstituted alkyl acyl groups containing from one to ten carbon atoms; Z is selected from the group consisting of oxygen and sulfur; and R" and R''' are independently selected from the group consisting of alkyl, alkoxy, alkylthio, aryl, aryloxy, arylthio, aralkyl, aralkoxy, and aralkylthio groups containing from one to ten carbon atoms.

5. A compound of the formula

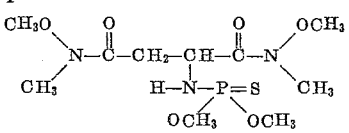

6. A compound of the formula

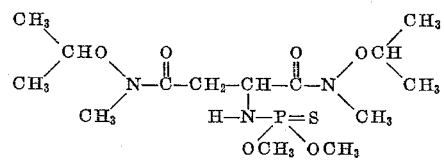

7. A compound of the formula

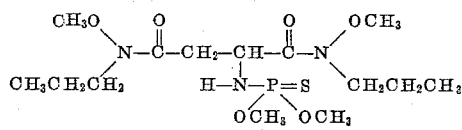

8. A compound of the formula

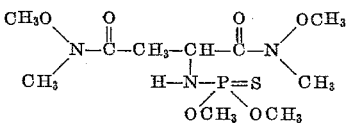

9. A compound of the formula

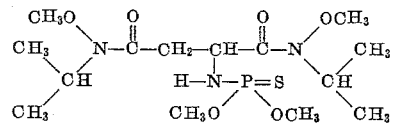

10. A compound of the formula

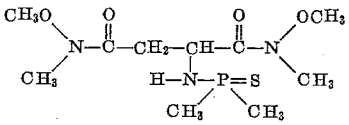

References Cited by the Examiner

UNITED STATES PATENTS

| | | | |
|---|---|---|---|
| 3,012,054 | 12/1961 | Moss | 260—461 |
| 3,062,705 | 11/1962 | Youngson | 167—22 |
| 3,092,544 | 6/1963 | Nault et al. | 167—30 |
| 3,134,801 | 5/1964 | Sehring et al. | 260—461 |
| 3,149,144 | 9/1964 | Huffman et al. | 260—461 |

CHARLES B. PARKER, *Primary Examiner.*

LEWIS GOTTS, *Examiner.*

S. K. ROSE, R. L. RAYMOND, *Assistant Examiners.*

UNITED STATES PATENT OFFICE
CERTIFICATE OF CORRECTION

Patent No. 3,280,226                  October 18, 1966

Eugene F. Barnas et al.

It is hereby certified that error appears in the above numbered patent requiring correction and that the said Letters Patent should read as corrected below.

Column 5, line 36, for "methylpohsphoro" read -- methylphosphoro --; column 6, lines 40 to 45, the formula should appear as shown below instead of as in the patent:

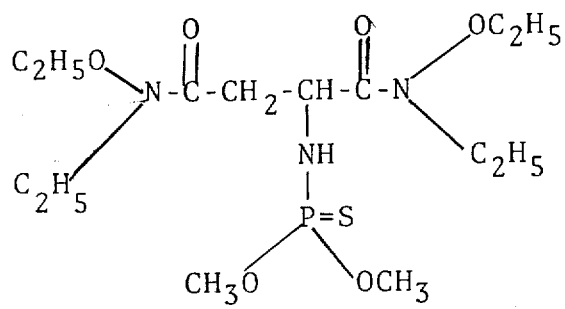

column 6, line 64, for "$N_1$" read -- $N'$ --; lines 66 to 70, the formula should appear as shown below instead of as in the patent:

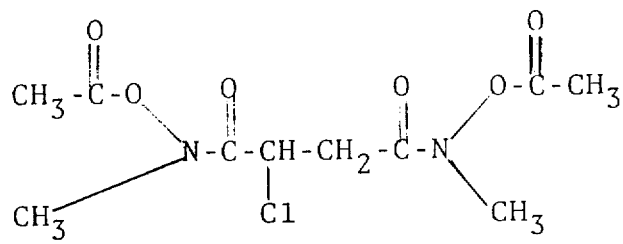

3,280,226 column 7, line 18, for "N,N-" read -- N,N′ --; lines 70 to 75, for the upper left-hand portion of the formula reading column 8, lines 58 to 65, for that portion of the formula reading:

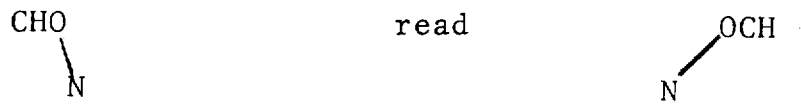

column 9, line 2, for "-α-N,N′-" read -- -α,N,N′- --; line 71, for "0.025" read -- 0.05 --; column 10, line 4, for "compound" read -- compounds --; line 8, for "Insecticles" read -- Insecticides --; column 12, lines 40 to 44, the formula should appear as shown below instead of as in the patent:

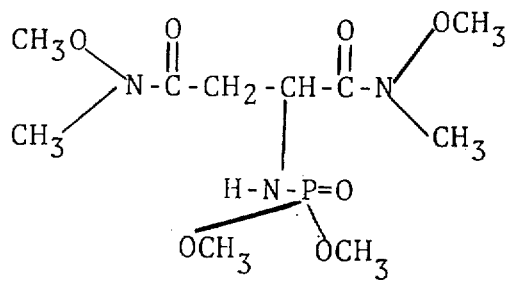

lines 19 to 24, the lower right-hand portion of the formula should appear as shown below instead of as in the patent:

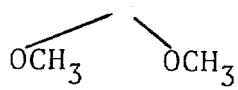

Signed and sealed this 5th day of September 1967.

(SEAL)
Attest:

ERNEST W. SWIDER
Attesting Officer

EDWARD J. BRENNER
Commissioner of Patents